United States Patent [19]

Dailey

[11] 4,287,792
[45] Sep. 8, 1981

[54] VARIABLE GEAR RATIO TRANSMISSION

[76] Inventor: Alvin Dailey, 4527 New Hampshire Ave., NW, Washington, D.C. 20011

[21] Appl. No.: 109,464

[22] Filed: Jan. 4, 1980

Related U.S. Application Data

[63] Continuation-in-part of Ser. No. 874,243, Feb. 1, 1978, Pat. No. 4,192,203.

[51] Int. Cl.³ .................. B60K 41/14; F16H 3/44; F16H 57/10
[52] U.S. Cl. .................. 74/863; 74/751; 74/752 A; 74/752 C; 74/773; 74/774; 74/789; 74/790; 74/793; 74/802; 74/867; 74/868
[58] Field of Search .......... 74/751, 793, 802, 773, 74/789, 753, 863, 752 A, 752 C, 337.5, 859, 867, 868, 774, 776, 790, 792

[56] References Cited

U.S. PATENT DOCUMENTS

| | | | |
|---|---|---|---|
| 857,476 | 6/1907 | Munsing | 74/773 |
| 1,299,629 | 4/1919 | Snider | 74/793 |
| 1,370,047 | 3/1921 | Rogers | 74/751 |
| 1,804,055 | 5/1931 | Herrmann | 74/773 |
| 2,292,079 | 8/1942 | Joyce | 74/751 |
| 2,384,996 | 9/1945 | Hanson | 74/773 X |
| 2,624,215 | 1/1953 | McRae | 74/768 X |
| 2,753,738 | 7/1956 | O'Leary | 74/773 X |
| 3,008,341 | 11/1961 | Cobb | 74/790 X |
| 3,088,337 | 5/1963 | Bemmann et al. | 74/752 A |
| 3,121,483 | 2/1964 | Lietz | 74/863 X |
| 3,240,083 | 3/1966 | Stoddard | 74/790 X |
| 3,448,828 | 6/1969 | Goldberg | 74/802 X |
| 3,566,717 | 3/1971 | Berman et al. | 74/859 |
| 3,876,342 | 4/1974 | Dailey | 418/83 X |
| 4,023,442 | 5/1977 | Woods et al. | 74/863 |
| 4,080,847 | 3/1978 | Thomas | 74/751 |
| 4,192,203 | 3/1980 | Dailey | 74/863 |

Primary Examiner—Leslie Braun
Attorney, Agent, or Firm—Donal B. Tobin

[57] ABSTRACT

A constant meshed, infinitely variable gear ratio transmission using relatively low pressure, low volume hydraulic systems to control the transmission gear ratio. The transmission includes a gear box having an input and output shaft. The gear box houses two sets of planetary gears which couple the input and output shafts together. A pinion gear is fixed to each shaft. A set of planetary gears mesh with each pinion and a plurality of planetary gear shafts connect the corresponding planetary gears of each pinion together. A cage is rotatably supported in the housing. A first hydraulic system controls the rotation of the cage. A second and independent hydraulic system controls the rotation of the planetary gear shafts by selectably controlling the rotation of the cage and the rotation of the planetary gear shafts so that the gear ratio for the transmission may be intermediately selected. A clutch mechanism is used to selectably engage the control system for the cage.

14 Claims, 10 Drawing Figures

○ – FULLY OPENED  ◐ – PARTIALLY OPEN  ● – FULLY CLOSED

VARIABLE GEAR RATIO TRANSMISSION

BACKGROUND OF THE INVENTION

This application is a continuation-in-part of U.S. patent application Ser. No. 874,243 filed Feb. 1, 1978 now U.S. Pat. No. 4,192,203.

The present invention relates to a transmission and more particularly to a constant mesh variable gear ratio transmission spanning the range from a low gear ratio to direct-drive.

Transmissions have been used for many years in a variety of environments including automobiles, trucks and other moving vehicles when a variety of gear ratios is required. Hydraulic transmissions typically utilize fluid couplings to connect an engine drive shaft to a transmission output shaft. Fluid couplings typically experience significant energy losses. Oil or other hydraulic fluid with which the coupling is filled is directed from an impeller driven by the engine between the vanes of a turbine. The oil drives the turbine at an increasing speed until the turbine rotates at the same speed as the impeller. Although a fluid coupling can provide a smooth take-up so that the vehicle moves off without jerking, a significant amount of energy can be lost in this fluid coupling.

Hydraulic transmissions typically also include two planetary gear sets employing a centrally mounted pinion and one or more planetary gears which engage with the pinion and with the teeth on the inside of an annular ring gear commonly known as an annulus. The transmission of force through the transmission is accomplished by the planetary gear sets and the fluid coupling. A specific number of pre-determined stepped gear ratios are typically provided by using friction clutches to selectively lock the sun gear, the annulus or the planet gears separately or in various combinations. There can be additional energy losses in the friction clutches used to control the motions of these various gears. An example of this type of transmission is shown in U.S. Pat. No. 2,624,215 to McRae. It is apparent that transmissions using fluid couplings and friction clutches can be inefficient and complicated to manufacture and maintain. Because they also tend to be large and heavy and inefficiently consume power, they are not well suited for use in the more compact lightweight automobiles that are becoming more and more prevalent. Furthermore, because of the energy losses experienced and the limited number of stepped gear ratios available in such transmissions, it is often difficult to match the most feasible gear ratio to the horsepower output of the engine and the applied load.

Large and inefficient transmissions would tend to overtax the smaller engines that are presently used more and more frequently and, thus, significantly reduce engine efficiency and increase gasoline consumption.

One such new lightweight and efficient engine is disclosed in my U.S. Pat. No. 3,876,342. There is a need for more efficient transmissions that will be more compatible with such new engines. The more efficient use of energy, the weight and material savings resulting from the use of this engine and transmission will have a cumulative similar effect in the vehicle in which they are installed.

Some transmission mechanisms use hydraulic systems rather than friction clutches to control the motion of various elements of their planetary gear sets to provide different gear ratios; see for example U.S. Pat. No. 3,008,341 to Cobb and U.S. Pat. No. 3,240,083 to Stoddard.

The elimination of friction clutches may increase the efficiency of the transmission somewhat but the use of large amounts of hydraulic fluid, sometimes under high pressure, to operate these systems is a further source of transmission inefficiency.

SUMMARY OF THE INVENTION

The present invention provides a constant meshed, infinitely variable gear ratio transmission which is efficient and lightweight. No fluid coupling is used. Old friction clutches are replaced by hydraulic systems which operate at relatively low pressures and use relatively small quantities of hydraulic fluid.

A unique feature of my transmission is that of augmenting a lower gear ratio with a higher one to give a series of summarized single intermediate gear ratios at the drive shaft that numerically span from a preselected low gear ratio to a direct through one to one drive. Since gears are in constant mesh, no intermediate coupling need be interposed to ensure smoothness of shifting.

The transmission includes a gear box into which are journalled an input and an output shaft. A plurality of planetary gear sets couple the shafts together and include a pinion gear on each shaft, a set of planetary gears meshing with each pinion gear, and a plurality of planetary gear shafts connecting the corresponding planetary gear of each pinion together. A cage is rotatably supported in the housing and supports each planetary gear shaft.

A hydraulic circuit is provided for controlling the rotation of the cage. A second and independent hydraulic circuit is provided for controlling the rotation of the planetary gear shafts. The first hydraulic circuits include a pump which energizes a series of rotation retardation cylinders mounted on the transmission housing and which have pistons whose movement is controlled by the hydraulic system. Piston rods connected to each piston engage a cam surface on an eccentrically mounted cam splined to a shaft, mounted coaxially with the transmission input shaft and selectably coupled to the cage through a clutch. The first hydraulic circuits regulate the back pressure on the piston to control the force with which the piston rod is pushed against the cam surface. Usually four rotation retardation cylinders are disposed around the periphery of the cage in such a location that at least one cylinder would be acting to achieve rotation retardation of the cage when such would be desired by the chosen operational mode of the transmission. The action of the rotation retardation pistons is synchronized by a series of valves in the hydraulic system which are responsive to the rotation of the cage. This first hydraulic system also includes a selectable valve which controls the fluid circuit to either lock the cage in low gear, permit it to rotate freely in neutral or to permit only forward rotation in high or at intermediate gears.

The present invention also includes a second hydraulic circuit which is a closed circuit for controlling the rotation of the planetary gear shafts. Each planetary gear shaft has affixed to it a cam having a cam surface about its periphery.

Rotation retardation cylinders house pistons with piston rods which engage the cam surface of the cams. A flow regulating valve is provided in the closed circuit to regulate the amount of flow in the circuit and thus to regulate the back pressure exerted on the pistons of the rotation retardation cylinders. When the valves are completely opened the cams are allowed to rotate freely in neutral or low gear. When the flow regulating valves are completely closed the cams are locked for high gear. The rotation of the cams will be controlled between these two extremes depending upon the amount that the flow regulating valve is open for the intermediate gear ratios. The effect of retarding the rotation of the cams is to provide an intermediate gear ratio equivalent to the sum of the high gear torque augmented by a selected low gear torque.

A pump is also provided for delivering hydraulic fluid under pressure to operate the rotation retardation cylinders for the cage.

DESCRIPTION OF THE DRAWINGS

Other features and advantages of this invention will be apparent from the following description of certain embodiments thereof taken in conjunction with the following drawings wherein.

DETAILED DESCRIPTION OF THE PREFERRED EMBODIMENT

Figure 1:
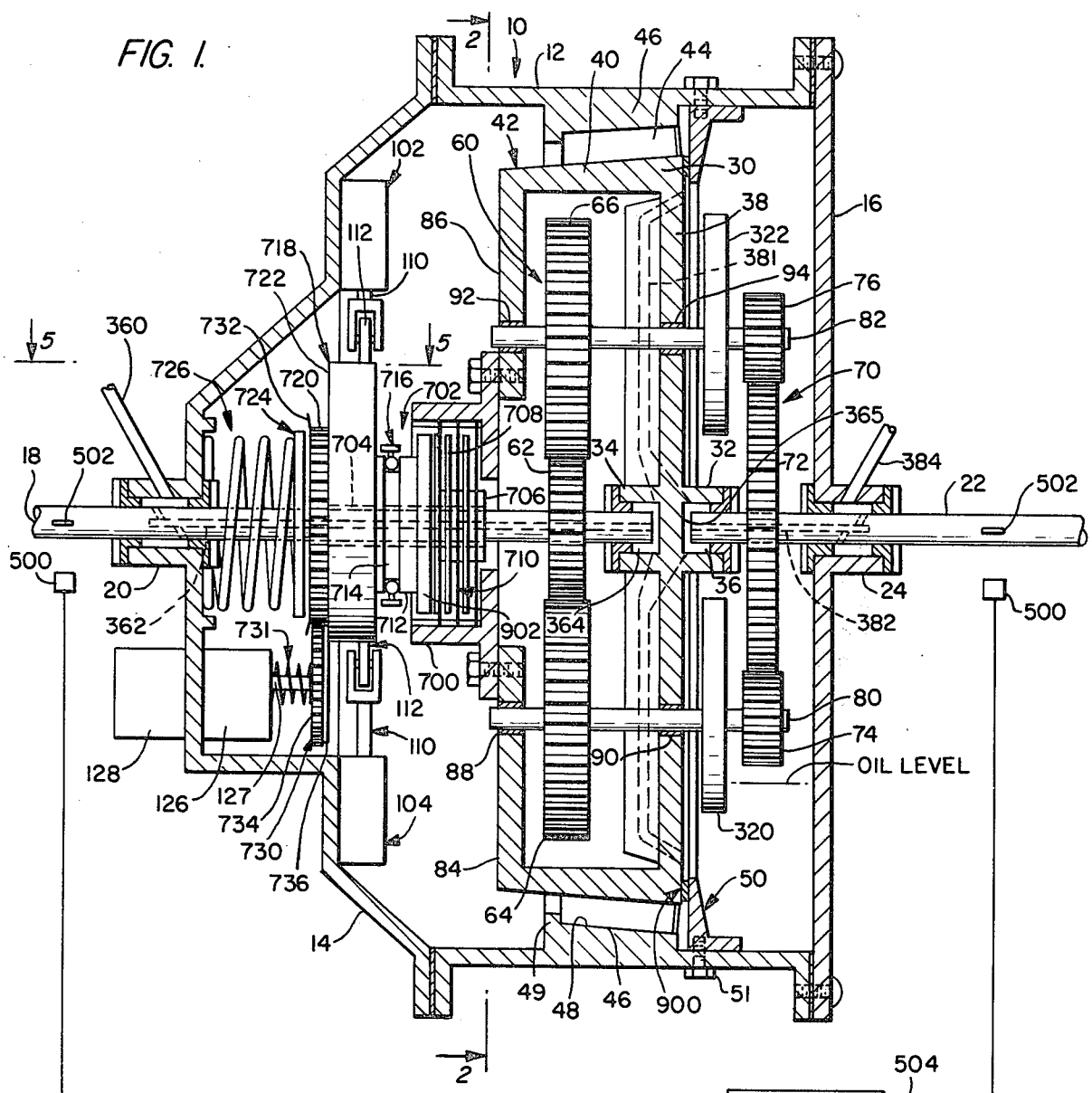
FIG. 1 shows a cross sectional view of the gear box of the transmission of the present invention together with a schematic view of electronic controls for operating the transmission in an automatic mode as opposed to manually selecting the desired intermediate gear ratio.

Referring now to FIG. 1, there is shown a gear box generally designated as 10 having a generally rectangular central portion 12 and two end covers 14 and 16. An oil level is maintained within the gear box to ensure anti-friction rotation. A crank shaft 18 from the motor (not shown) is journaled through front cover 14 by means of a combination antifriction bearing and oil pressure seal 20. Drive shaft 22 is journaled through rear cover 16 by means of a combination antifriction bearing and oil pressure seal 24.

A cage 30 is supported for rotation within central portion 12 of gear box 10. Cage 30 includes a hub 32 into one side of which is journaled the end of crank shaft 18 by means of a combination antifriction bearing and oil pressure seal 34. The end of drift shaft 22 is journaled into the other side of hub 32 by means of a combination antifriction bearing and oil pressure seal 36. The hub 32 supports a generally circular web 38 extending radially from the hub. Web 38 extends completely across the hub 32 of cage 30 to segregate the cavities into which shafts 18 and 22 are journaled. A generally cylindrical rim 40 extends from the circumference of web 38 in a direction generally perpendicular to the web. The outer circumferential surface 42 of rim 40 is tapered to accommodate a set of roller bearings 44 by which cage 30 is rotatably mounted inside gear box 10.

A generally cylindrical bearing support 46 is disposed on the inside of central portion 12 of gear box 10 generally coaxially with crank shaft 18 and drive shaft 22. Bearing support 46 has a bearing support surface 48 which is tapered to correspond to the taper of outer circumferential surface 42 of rim 40. Roller bearings 44 are supported between the confronting surfaces 42 and 48 to rotatably mount cage 30 within gear box 10. The end of bearing support 46 closest to front end cover 14 of the gear box 10 has a circumferential flange 49 extending radially inward for retaining roller bearings 44 in position. An annular thrust ring 50 and a friction reducing thrust bearing 900 are disposed across the end of bearing support surface 46 closest to end cover 16 of gear box 10 to hold roller bearings 44 in place and is secured to portion 12 by bolts 51.

Gear box 10 houses a first gear set 60 and a second gear set 70. The first gear set 60 includes a pinion gear 62 fixed to crank shaft 18, and two planetary gears 64 and 66 each of which mesh with pinion gear 62. The radius of planetary gears 64 and 66 are equal to one another and both are greater than the radius of pinion gear 62.

Second gear set 70 includes a pinion gear 72 fixed to drive shaft 22 and two planetary gears 74 and 76 which mesh with pinion gear 72. The radius of planetary gears 74 and 76 are equal to one another and are both less than the radius of pinion gear 72.

Corresponding planetary gears 64 and 74 are both fixed on a planetary gear shaft 80. Corresponding planetary gears 66 and 76 are both fixed on a planetary gear shaft 82. To allow for installation or disassembly, fixing of said gears to said shafts 80 and 82 could be achieved by splines or other suitable means. An arm 84 depends radially inward from the edge of rim 40 removed from web 38. A second arm 86 depends radially inward from the edge of rim 40 removed from web 38. Gear shaft 80 is supported for rotation between arm 84 and web 38 generally parallel to the axis of crank shaft 18 and drive shaft 22 by means of an antifriction bearing 88 mounted near the inner end of radially depending arm 84 and by means of antifriction bearing 90 mounted in web 38. Planetary gear shaft 82 is similarly mounted between arm 86 and web 38 by means of antifriction bearings 92 and 94 mounted to permit shaft 82 to rotate about an axis generally parallel to the axes of crank shaft 18 and drive shaft 22.

In this preferred embodiment each gear set 60 and 70 has only two planetary gears and planetary gear shafts 80 and 82 are disposed 180° from each other about hub 32. If it is desired, it is possible to provide three, four or more planetary gears for each pinion gear 62 or 72 and these could be equiangularly spaced about hub 32 by means of additional planetary gear shafts like 80 and 82 and additional support arms like 84 and 86.

Planetary gear sets 60 and 70, supported by means of gear shafts 80 and 82 on cage 30, provide a constant mesh drive between crank shaft 18 and drive shaft 22. No fluid coupling is used. When the transmission is in low gear, cage 30 is held fixed and the low gear ratio is dictated by the relative radii of the gears of the planetary gear sets 60 and 70. High gear is achieved by preventing planetary gear shafts 80 and 82 from rotating about their axes and permitting cage 30 to rotate freely in the same direction as shaft 18 just as though crank shaft 18 and drive shaft 22 were rigidly connected together. An infinite variety of intermediate gear ratios can be obtained by controlling the rotation of gear shafts 80 and 82 about their axes. In the present invention separate means are provided for controlling the rotation of the cage 30 and for controlling the rotation of planetary gear shafts 80 and 82. These systems will now be discussed starting with the system for controlling the cage.

Still reffering to FIG. 1, clutch housing 700 is bolted to arms 84 and 86 and is centered about input shaft 18. Clutch housing 700 contains clutch 702 which includes clutch shaft 704 mounted coaxially about shaft 18 and extending from inside housing 700 a short distance toward end cover 14. While items 718, 706, 712, 714 and pressure plate 902 can all be made as one unit, however, as explained herein, shaft 704 includes an expanded diameter portion 706, or spline shaft, to which is fixed a number of clutch plates 708. Clutch plates 708 can be splined or otherwise fixed to spline shaft 706. Three clutch plates 708 are preferably used. A corresponding number of annular clutch friction plates 710 are fixed to the inside of housing 700 and are aligned for engagement with clutch plate 708. Yoke receiver 712 is also fixed to clutch shaft 704 and includes a recess 714 for receiving yoke 716. Sliding contact is provided between yoke 716 and its receiver 712 in a conventional manner so that the shaft 704 can rotate about shaft 18 and yoke 716 can move clutch shaft 704 axially back and forth to engage and disengage the clutch in response to an actuation mechanism which will be described later in conjunction with FIG. 5.

Circular cam 718 is also fixed to shaft 704 in an eccentric manner, i.e., the axis of cam 718 is radially offset from but parallel to the axis of shaft 704. Take-off gear 720 is fixed to the end of and coaxially aligned with shaft 704. Gear 720 may also be fixed to face 722 of cam 718 to provide greater bonding strength between cam 718 and gear 720. Throwout bearing 724 is loosely mounted about shaft 18 and is adapted to bear against gear 720. Compression spring 726 is coaxially aligned about shaft 18 and extends between the inside of cover 14 and throwout bearing 724 to force clutch plates 708 into engagement with clutch friction plates 710. When the clutch is engaged cam 718 and cage 30 will be locked together and will turn as a single unit.

Figure 5A:
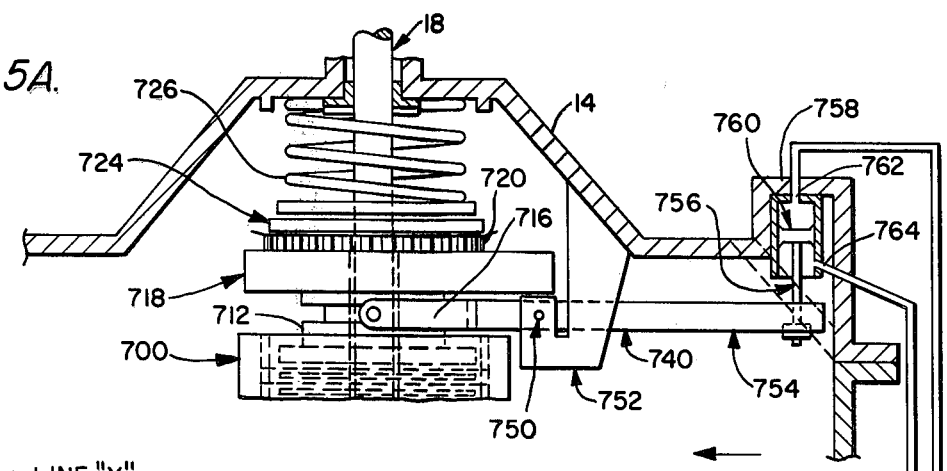
FIGS. 5A and 5B show a schematic representation of the clutch mechanism and its operating valve used to couple the cage to its hydraulic control system.
Figure 5B:
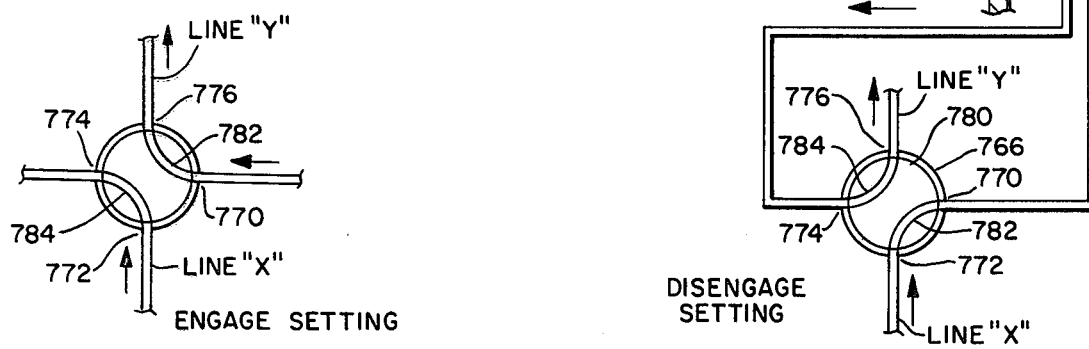

Referring to FIG. 5, the clutch actuation mechanism will now be described. Yoke arm 740 extends from yoke 716 and is pinned by hinge pin 750 to support bracket 752 extending from cover 14. End 754 of yoke arm 740 moves up and down (as shown in FIG. 5) under the influence of piston rod 756 which rides in cylinder 758 to correspondingly move clutch 702 into and out of engagement. A piston 760, which is connected to piston rod 756, is a double action piston which moves in cylinder 758 under the influence of hydraulic fluid delivered to the top or bottom of cylinder 758 through ports 762 and 764 respectively. Port 762 is connected to line "X" and then to rotatable valve 766. Line "X" is a high pressure line connected to the output of pump 120 shown in FIG. 6. Port 764 connected to line "Y" and then to valve 766. Line "Y" is a low pressure line connected to the pump reservoir. Valve 766 has four ports 770, 772, 774 and 776.

Valve 776 has a barrel 780 with two curved passages 782 and 784 for connecting ports 770, 772, 774 and 776 together in selectable pairs. Valve barrel 780 is rotated by a foot pedal mounted in the driver's compartment and appropriate linkages (not shown). To disengage the clutch barrel 780 is positioned so that passage 782 connects ports 772 and 770 to deliver high pressure fluid to port 762 and drive piston downward in FIG. 5 and operate yoke arm 740 to compress spring 726. As piston 760 moves down, fluid will leave cylinder 758 through port 764 and go into line "Y", into port 774, through passage 784 and out through port 776 and back to the reservoir of pump 120 shown in FIG. 6. To engage the clutch, barrel 780 is rotated ninety degrees counter-clockwise, corresponding to letting out the clutch foot pedal, so that passage 784 connects ports 772 and 774, to deliver high pressure fluid through line "X" to the lower port 764 of cylinder 758. This lifts end 754 of yoke arm 740 and lowers the clutch into engagement. The clutch is held tightly engaged by both the hydraulic pressure from cylinder 758 and the spring pressure from spring 726 so that cage 30, the clutch and its cam 718 will rotate together as a unit.

Figure 6:
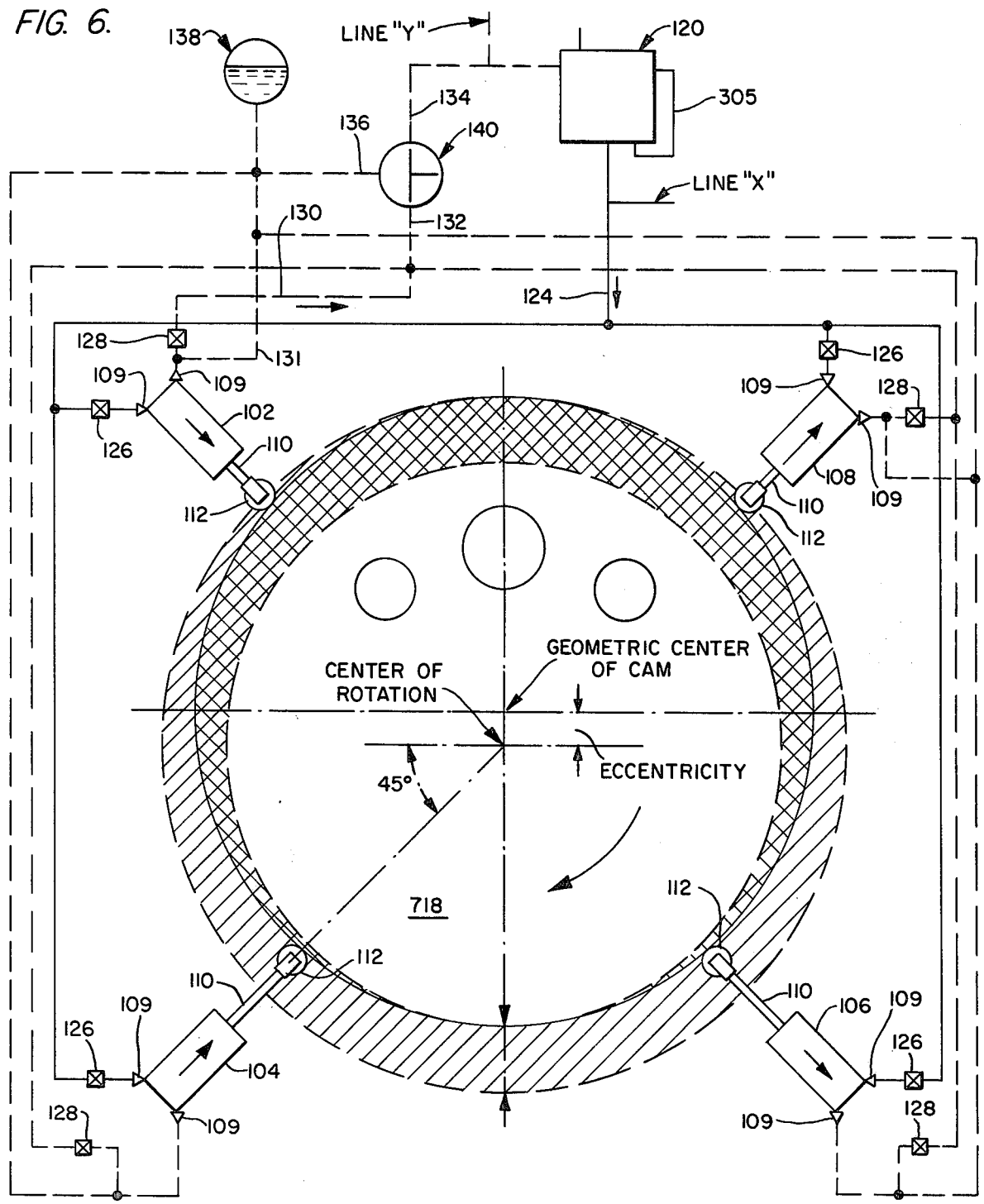
FIGS. 6, 6A, 6B and 6C show a schematic representation of the hydraulic circuit for the rotation retardation pistons for the cage.
Figure 6A:
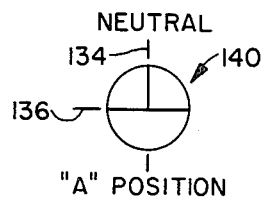
Figure 6B:
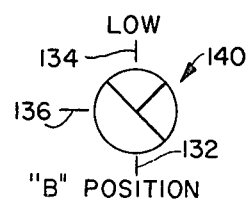
Figure 6C:
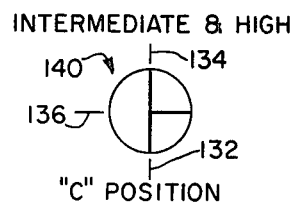

Rotation retardation cylinders 102, 104, 106, and 108, see FIG. 6, are mounted on cover 14 equiangularly about shaft 18. Each one of retardation cylinders 102, 104, 106, and 108 has a piston rod 110 extending generally radially toward the axis of rotation of cage 30 and supports a roller 112 which rollably engages the cam surface of cam 718. Since the cam is eccentrically mounted on clutch shaft 704, it is evident that when the clutch 702 is engaged and the cam rotates with cage 30 under the influence of drive shaft 18, piston rods 110 will be driven by the cam 718. If hydraulic pressure is introduced to the cylinders, the motion of piston rods 110 will be retarded and so will the rotation of cam 718 and correspondingly cage 30.

Referring to FIG. 6, piston rod 110, corresponding to cylinder 102, engages the cam surface close to its eccentric high point. The piston rod corresponding to cylinder 104 engages the cam surface close to its eccentric low point, one quarter of a revolution from cylinder 102. Piston rods for cylinders 106 and 108 correspondingly engage the cam surface near low and high points, respectively, and are spaced one quarter of a turn apart. It can be seen that if the piston rods 110 are locked, it will not be possible for cage 30 to rotate in either direction. On the other hand, if piston rods 110 are free to reciprocate in and out of their respective cylinders, because the hydraulic pressure is zero, cage 30 can rotate freely in either direction. If the reciprocating motion of piston rods 110 is slightly retarded in a synchronized fashion, cage 30 will be permitted to rotate only in one direction.

The hydraulic system associated with retardation cylinders for controlling the rotation of cage 30 will now be described in connection with FIG. 6. A pump provides hydraulic fluid under pressure to the retardation cylinders. The operation of pump 120 will be described in more detail in connection with FIG. 3. Pump 120 is connected to each one of retardation cylinders 102, 104, 106 and 108 in parallel by means of hydraulic pressure line 124. Retardation cylinder 102 has a cam operated valve 128 connected in series with the outlet from cylinder 102. The inlet and outlet of each cylinder 102, 104, 106, and 108 have one-way valves 109 to prevent fluid backflow into them. A return line 130 is connected between the outlet of each rotation retardation cylinder 102, 104, 106 and 108 through each outlet valve 128 and to the first port 132 of a three-way valve 140. The second port 134 of three-way valve 140 is connected between the outlet of each retardation cylinder 102, 104, 106 and 108 and a third port 136 of three-way valve 140. One surge tank 138 is connected to return line 131 to account for the incompressibility of liquid, the movement of valves 126 and 128, and the initial movement of retardation cylinders 102, 104, 106 and 108.

Inlet cam valve 126 and outlet cam valve 128 are synchronized to open and close in response to the rotation of cage 30. This synchronization is accomplished as follows.

As is shown in FIG. 1, gear 720 meshes with gear 730 which is splined onto valve stem 127 of valve 126. Gear 730 is also spring mounted about stem 127 by means of tension spring 731 so that it can move axially with gear 720. Flange 732 extends radially from the edge of gear 720 and engages surface 734 of gear 730. Spacer ring 736 is fixed to the other surface of gear 730 and abuts against and slides on surface 722 of cam 718. Flange 732 holds spacer ring 736 of gear 730 against surface 722 of cam 718 so that gear 730 will move axially with gear 720 when it moves back and forth as clutch 702 is operated.

Figure 3:
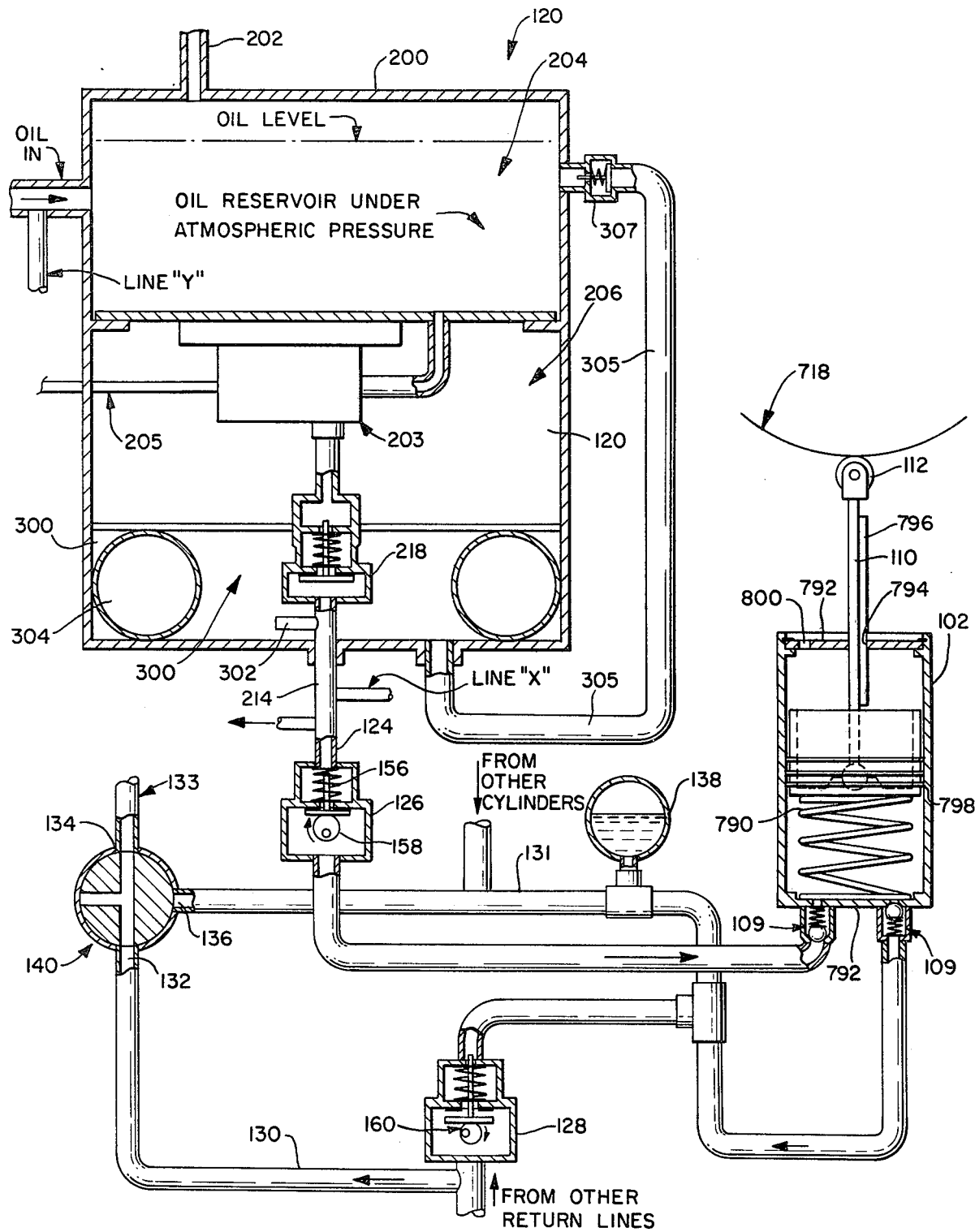
FIG. 3 shows a schematic representation of the pump used in connection with the present invention together with a schematic representation of the accompanying hydraulic system for one of the rotation retardation cylinders for the cage.

Gear 730 drives valve stem synchronously with cam 718 in accordance with the gear tooth ratio of gears 720 and 730 to synchronize the opening and closing of valve 126 to regulate the hydraulic pressure in the retardation cylinders. The valve stem for valve 128 is the same as that for valve 126 but the valve seat is arranged differently so that when valve 126 is open, valve 128 is closed. As shown in FIG. 3, inlet cam valve 126 is biased open by means of a spring 156. Cam 158, disposed inside valve 126, on its valve stem, opens and closes the valve as it rotates. The surface of cam 158 is chosen so that valve 126 will be open during approximately one-half of a revolution of cam 158 and will be closed for the remaining half of the revolution of cam 158. It may also be seen from FIG. 3 that outlet cam operates in the same manner as inlet valve 126 but it is 180° out of phase with inlet valve 126. Outlet valve 128 has a cam 160 similar to cam 158.

Returning again to FIG. 6, each rotation retardation cylinder 102, 104, 106. and 108 has its own set of inlet and outlet cam valves like inlet valve 126 and outlet valve 128 and each is operated in the same manner as inlet valve 126 and outlet valve 128. Each set has its own gear 730, thus the operation of each inlet and outlet cam valve 126 and 128 is synchronized to the rotation of cage 30.

Depending on the position of three-way valve 140, the hydraulic circuit will operate to lock cage 30, to permit cage 30 to rotate freely in either direction, or to permit rotation in only one direction.

The position of three-way valve 140 for operating the transmission in high and intermediate gear will now be described, i.e., cam 718 will be permitted to rotate in only one direction. In high gear the "C" position for valve 140 is maintained, however, the clutch is disengaged thereby preventing needless continued rotation of cam 718 and reciprocation of cylinders 102, 104, 106 and 108. Also, valve 390 is fully closed thus preventing rotation of the planetary gears within cage 30 about their own axis. Thus the planetary cage and shafts 18 and 22 all rotate in unison. Cam 718 remains still through disengagement of the clutch. It can be seen that when three-way valve 140 is connected as shown in FIG. 6, between its first port 132 and its second port 134 (the "C" position), line 131 between the outlet of rotation retardation cylinder 102 and the third port 136 of valve 140 will be blocked so that hydraulic fluid will have to return to pump 120 through outlet cam 128 and hydraulic line 130. In this position, the action of inlet and outlet cam valves 126 and 128 is synchronized to permit rotation of cage 30 only in the same direction as crank shaft 18, i.e., clockwise as shown in FIG. 6. Inlet cam 126 and outlet cam 128 are synchronized so that 126 will open to let fluid into cylinder 102 and outlet valve 128 will close. Thus hydraulic pressure forces piston rod 110 out of cylinder 102 and keeps rod 110 in contact with cam 718 as the cam turns toward a low point. When the low point is reached valve 126 closes and valve 128 opens to let fluid flow out of cylinder 102 and to let rod 110 recede into cylinder 102. The cam cannot reverse direction because check valve 109 prohibits backflow. Thus if the cam tries to reverse direction while the rod 110 is extending, the rod will lock because outlet 128 is closed and the fluid is prevented from flowing back through inlet 126 by check valve 109 and by the full pump pressure urging rod 110 outward. Thus cam 718 can turn only in one direction.

As shown in FIG. 3, each cylinder 102, 104, 106 and 108 includes a spring 790 inside the cylinder and bearing against the piston to provide a light pressure to keep rod 110 in contact with the surface of cam 718. The base 792 of cylinder 102 has a slot 794 and rod 110 has a cooperating key 796 to keep rod 110 from rotating. Rings 798 seal the piston in the cylinder 102. Any oil that may leak by rings 798 can exit through vents 800 in base 792. Check valves 109 are shown fixed to cylinder 102 rather than separated from cylinder 102 as shown schematically in FIG. 6. Cylinders 104, 106 and 108 are constructed the same way as cylinder 102. As will be explained more fully subsequently, it is important to prevent cage 30 from reversing its direction when the transmission is set at an intermediate gear ratio between high gear and low gear, or at low gear.

Still referring to FIG. 6 the position of three-way valve 140 will now be described for operating the transmission in low gear. When three-way valve 140 is rotated 45° counterclockwise effectively blocking ports 134 and 136, the return to pump 120 will be blocked because return lines 131 and 130 will be discontinuous beyond three-way valve 140 and will form a closed loop providing a hydraulic lock on each rotation retardation cylinder 102, 104, 106 and 108. Thus, cage 30 will not be permitted to rotate in either direction. In low gear, crank shaft 18 directly drives pinion 62 which in turn drives planet gears 64 and 66 which through planetary gear shafts 80 and 82 drive planetary gears 74 and 76 which in turn drive pinion gear 72 which is fixed to output shaft 22. Thus, the low gear ratio will be determined by the relative dimensions of the two planetary gear sets 60 and 70.

When three-way valve 140 is connected between ports 136 and 134, return line 130 will be blocked and return line 131 is connected directly to the reservoir of pump 120 so that outlet cam valve 128 is by-passed. Thus, rotation retardation cylinders 102, 104, 106 and 108 reciprocate freely and provide no retardation force on cage 30. This corresponds to the neutral position where output shaft 22 does not rotate. Crank shaft 18 will drive pinion gear 62 which drives planetary gears 64 and 66 which in turn, through shafts 80 and 82, drives planetary gears 74 and 76 to rotate around pinion gear 72 which does not rotate. Thus, if crank shaft 18 rotates clockwise cage 30 will freely rotate counterclockwise. In this mode the clutch is disengaged so that the pistons do not reciprocate needlessly and experience extra wear or cause vibration.

Referring again to FIG. 3, pump 120 that is used in association with the transmission of the present invention will now be described. Pump 120 preferably includes a generally cylindrical reservoir housing 200 vented to the atmosphere through vent 202. Housing 200 is divided into an upper oil reservoir chamber 204 and a lower chamber 206 which houses positive displacement pump 203 driven off the crank shaft by linkage 205.

Conduit 214 connects with line 124 of the hydraulic circuit shown in FIG. 6. A check valve 218 is disposed in outlet conduit 214 to permit flow only in one direction out of pump 120 in response to a predetermined pump pressure level. Pump 203 supplies desired hydraulic fluid under pressure to line 214 through check valve 218 to operate retardation cylinders 102, 104, 106 and 108.

A surge tank 300 is shown in FIG. 3 attached to the bottom of reservoir housing 200. A quantity of hydraulic fluid is stored in the surge tank and outlet 302 from outlet conduit 214 communicates directly with the interior of surge tank 300. A toroidal shaped, flexible rubber membrane 304 encloses air captured under pressure. To prevent rupture from excessive oil pressure build up, an oil return line 305 with a pressure relief valve 307 has been provided to communicate between storage/surge tank 300 and oil reservoir 204. The expansion and contraction of membrane 304 regulate the pressure in surge tank 300 to a substantially constant value. Alternatively, surge tank 300 may be a separate tank not connected to reservoir housing 200. If desired, an oil pressure gauge may be inserted in surge tank 300 to provide a means for activating a warning light indicating low pressure in the surge tank in order to warn the operator when hydraulic pressure in the system drops below the required level. Outlet conduit 214 is connected directly to conduit 124 as shown in FIG. 3.

Figure 2:
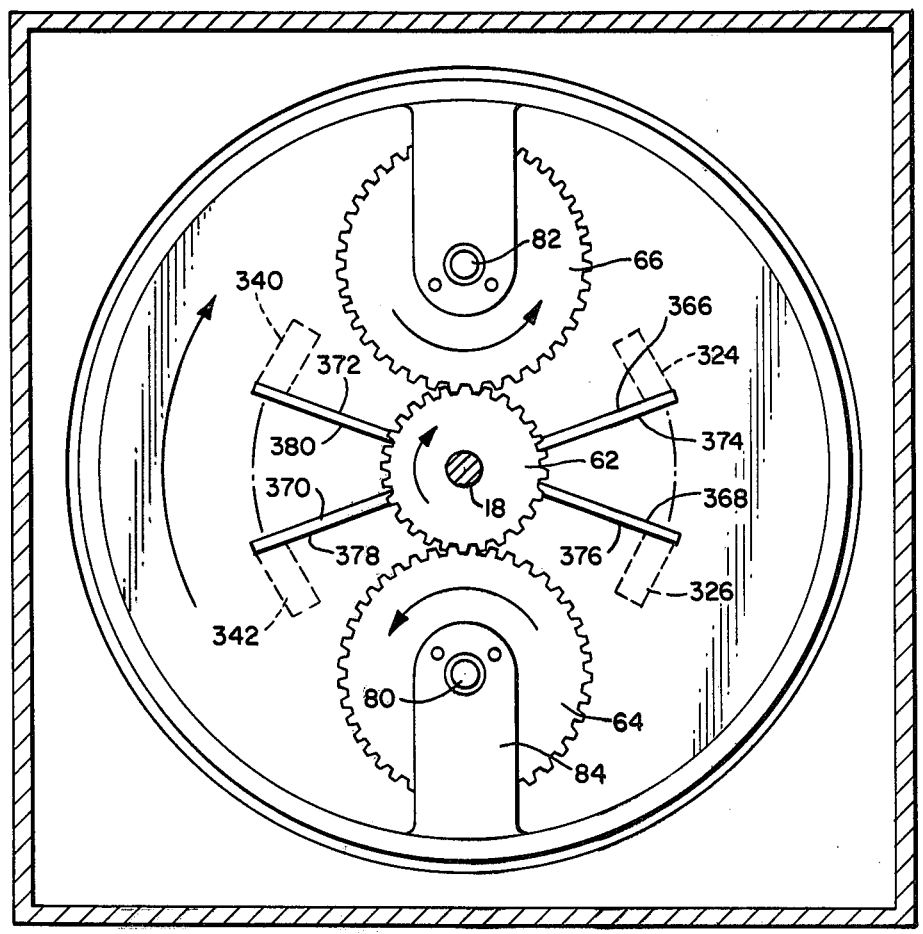
FIG. 2 shows a front view of the gear box taken along line II—II in FIG. 1
Figure 4:
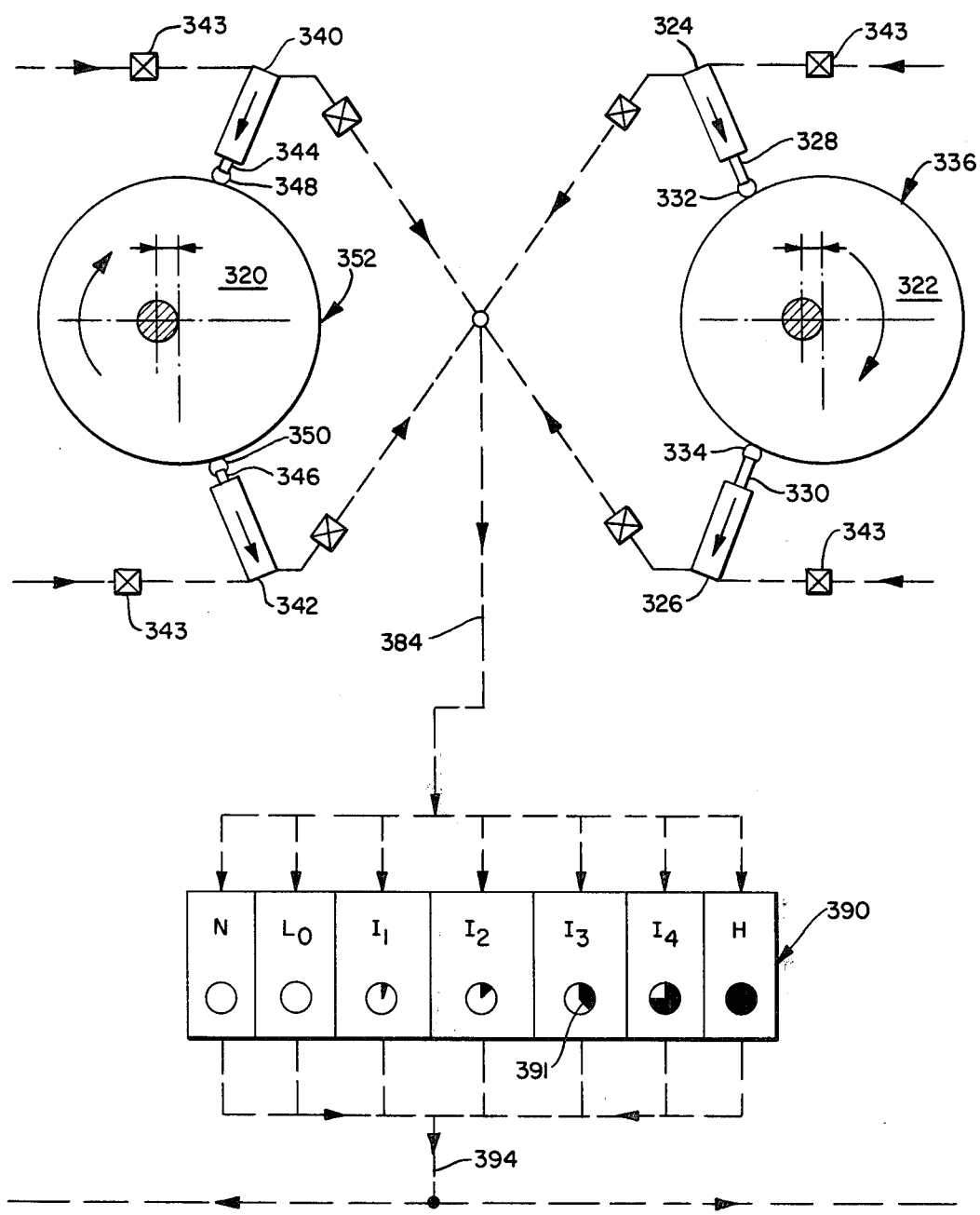
FIG. 4 shows a schematic representation of a second hydraulic circuit used in the present invention.

The hydraulic system for controlling the rotation of planetary gear shafts 80 and 82 will now be described in conjunction with FIGS. 1, 2 and 4. In FIG. 1 offset cams 320 and 322 are shown affixed respectively to planetary gear shafts 80 and 82 in a position between web 38 and planetary gears 74, 76 respectively so that the cams 320 and 322 rotate together with shafts 80 and 82 with their axes of rotation offset radially from but parellel to the axis of rotation of the gear shafts 80 and 82. Referring to FIG. 2, rotation retardation cylinders 324 and 326 are mounted on a circular circumference on the side of web 38 facing end cover 16 of gear box 10. Referring now to FIG. 4, cylinders 324 and 326 have piston rods 328 and 330, respectively, which in turn support rollers 332 and 334, respectively, which engage a cam surface 336 on cam 322.

Roller 334 contacts surface 336 at one point and roller 332 contacts surface 336 at another point so that their corresponding pistons are extended different amounts. Additional rotation retardation cylinders 340 and 342 are similarly placed on the same side of web 38 and include similar piston rods 344 and 346 which support similar rollers 348 and 350 which engage a similar cam surface 352 on cam 320. Each cylinder 324, 326, 342 and 340 (these are similarly configured as 102 in FIG. 3) has a one-way valve 343 in series with its inlet to prevent hydraulic fluid from reversing direction as it circulates through the closed system. To keep the hydraulic fluid in this system cool, it may be circulated through conventional cooling means like the radiator of the automobile in which the transmission is mounted.

Referring again to FIG. 1, the conduit for conveying hydraulic fluid to rotation retardation pistons 324, 326, 340 and 342 will now be described. Conduit 360 communicates with the housing of bearing 20 through which crank shaft 18 is journaled into front end cover 14 of gear box 10. A portion of crank shaft 18 between bearing 20 and hub 32 of cage 30, has a hollow channel 362. Channel 362 provides fluid communication between conduit 360 and a hollow chamber 364 in one side of hub 32. As shown best in FIG. 2, hydraulic distribution lines 366, 368, 370 and 372 communicated between chamber 364 and rotation retardation cylinders 324, 326, 342 an 340, respectively, to provide a means for delivering hydraulic fluid to these rotation retardation cylinders.

Hydraulic return lines 374, 376, 378 and 380 return hydraulic fluid from rotation retardation cylinders 324, 326, 342, and 340, respectively to a second chamber 365 in hub 32 which is isolated from chamber 364 by web 38. Return lines 374, 376, 378 and 380 pass through web 38 at points 381.

The portion of drive shaft 22 between bearing 36 and in hub 32 and bearing 24 by which shaft 22 is journaled through end cover 16 of gear box 10 has a hollow channel 382 to provide fluid communication between chamber 365 and the housing of bearing 24.

Return conduit 384 provides fluid communication from the housing for bearing 24. Thus, fluid communication through gear box 10 is provided as the hydraulic fluid enters through conduit 360 into the housing of bearing 20 into channel 362 of crank shaft 18 and into chamber 364 in hub 32, out through distribution lines 366, 368, 370 and 372 to rotation retardation cylinders 324, 326, 342 and 340, respectively, back through return lines 374, 376, 378 and 380 into chamber 365 in the other side of hub 32, out through channel 382 in drive shaft 22 into the housing of bearing 24 and out through return conduit 384. Suitable oil seals are provided at the points where the crank shaft 18 and drive shaft 22 are journaled through covers 14 and 16 respectively and hub 32.

Referring now to FIG. 4, a throttling valve 390 is in fluid communication with conduit 384 to receive hydraulic fluid. Valve 390 may be varied between a fully open and a fully closed position through an infinite number of intermediate positions. The shaded depictions 391 shows the extent the valve 390 is being closed for the intermediate gear ratios. The outlet 394 of throttling valve 390 is in fluid communicated with conduit 360. Valve 390 completes a closed hydraulic system for controlling the motion of the piston rods 328, 330, 346 and 344 of rotation retardation cylinders 324, 326, 342 and 340, respectively.

When the throttling valve 390 is in the fully opened position, the fluid will circulate freely through the closed system to permit cams 320 and 322 to rotate freely. The fully open position is required for the neutral position of the transmission when shaft 22 does not rotate and cage 30 rotates backwards, i.e., in the direction opposite to the crank shaft 18. Throttling valve 390 is also fully open in low gear, when cage 30 is locked in position. When the transmission is in the high gear position valve 390 is fully closed locking cog gears 320 and 322 so that crank shaft 18 and drive shaft 22 will rotate at the same speed and cage 30 rotates in the same direction as the crank shaft 18. Locking cams 320 and 322 have the effect of locking the planetary gears to their respective pinion gears so that they turn as a unit and cams 320 and 322 do not rotate with respect to the pinion gears.

At the intermediate positions of throttle valve 390, the rotation of the cams 320 and 322 is retarded so as to provide an intermediate gear ratio between low and high. Thus, it can be seen that the hydraulic system for controlling the rotation of planetary gear shafts 80 and 82 is also a low volume system capable of efficient and low maintenance operation.

The manual operation of the transmission will now be explained, for neutral, low, high and a respective intermediate gear, between high and low.

For operating the transmission in neutral, crank shaft 18 turns in the clockwise direction at the speed dictated by the engine and the clutch is disengaged, so that cam 718 will remain stationary and cage 30 will rotate freely in the counterclockwise direction and the piston rods 110 will rest on cam 718. Throttling valve 390 will be set in the fully open position so that cams 320 and 322 will be permitted to rotate freely without being impeded by the action of the rotation retardation cylinders 324, 326, 342 and 340. Crank shaft 18 will rotate at a specified RPM in the clockwise direction and correspondingly rotate pinion gear 62 of planetary gear set 60 in a clockwise direction. This rotation of pinion gear 62 will cause planetary gears 64 and 66 to rotate in the counterclockwise direction and rotate planetary gear shafts 80 and 82 to which they are respectively affixed. Shafts 80 and 82 will correspondingly rotate the planetary gears 74 and 76 to which they are respectively affixed and turn offset cams 320 and 322. Pinion gear 72 of gear set 70 and drive shaft 22 to which it is affixed will remain stationary so that planetary gears 74 and 76 will walk around the circumference of pinion gear 72 causing planetary gear shafts 80 and 82 to likewise walk around pinion gear 72 turning cage 30 with it so that it rotates counterclockwise by means of roller bearings 44 in the central portion 12 of the gear box 10.

In the low gear position, cage 30 is held stationary. The clutch is engaged and three-way valve 140 is rotated 45° counterclockwise to effectively block off ports 136 and 134 so that return lines 131 and 130 from each rotation retardation cylinder 102, 104, 106 and 108 provide a closed loop locking piston rods 110 and rollers 112 into engagement with cam surface of cam 718 to prevent the rotation of cage 30. Inlet cam valves 126 will stay closed and provide a fluid lock in rotation retardation cylinders 102, 104, 106 and 108. Throttling valve 390 will be completely open so that offset cams 320 and 322 may rotate freely without any retardation from cylinders 324, 326, 342, or 340. Thus, in low gear, drive shaft 18 will rotate in a clockwise direction correspondingly driving pinion gear 62 which will in turn drive planetary gears 64 and 66 in a counterclockwise direction turning pinion shafts 80 and 82 counterclockwise. Planetary gears 74 and 76 of gear set 70 which is affixed to planetary gear shafts 80 and 82, respectively will also turn counterclockwise and drive pinion gears 72, with which they mesh, in a clockwise direction. Pinion gear 72 is fixed to shafts 22 so shafts 22 will be driven in a clockwise direction at a lower speed than input shaft 18. The gear ratio of the transmission in the low position will be determined by the relative radii of the gears in gear sets 60 and 70.

In high gear, the clutch is disengaged so that cam 718 will remain stationary. The rotation of crank shaft 18 and drive shaft 22 are the same. This is achieved by locking offset cams 320 and 322 and permitting cage 30 to rotate in the same direction as shaft 18, thus prohibiting cage 30 from rotating backwards. Three-way valve 140 will be connected between ports 132 and 134. Since cam 718 is stationary there will be no hydraulic fluid flowing from the rotation retardation cylinders 102, 104, 106 and 108 to return through line 130 and return came valve 128. Crank shaft 18 rotates clockwise at the RPM designated by the engine and drives pinion gear 62 correspondingly to the clockwise direction. Since offset cams 320 and 322 are locked, planetary gear shafts 80 and 82 will not rotate about their own axes and thus planetary gears 64 and 66 will not rotate about their own axes. Thus, pinion gear 62 will be locked to planetary gears 64 and 66 and the entire planetary gear set 60 will rotate together driving cage 30 clockwise at the same speed as crank shaft 18. Correspondingly, planetary gears 74 and 76 of gear set 70 will be locked to pinion gear 72 so that pinion gear 72 and shaft 22 which is fixed to pinion gear 72 will rotate in the clockwise direction at the same speed as shaft 18 as if shafts 18 and 22 were rigidly connected together.

In an intermediate gear ratio three-position valve 140 is connected between ports 132 and 134 just as it is for the high gear position and cage 30 is similarly permitted to rotate clockwise freely, but the counterclockwise rotation of cage 30 is prevented by the synchronized action of rotation retardation cylinders 102, 104, 106 and 108. As previously explained, inlet and outlet cam valves 126 and 128 are synchronized to the rotation of cage 30. Outlet cam valve 128 may be operated from the same shaft 127 through a suitable linkage (not shown) or outlet cam valve 128 may be operated through a separate shaft operated in the same way as shaft 127. Inlet and outlet cam valves 126 and 128 are synchronized to the motion of cage 30 and synchronized 180° out of phase with each other. The purpose of this synchronization is to provide a force against cam surface which will prevent cage 30 from rotating counterclockwise but which will permit it to freely rotate in a clockwise direction. Throttling valve 390 will be placed in a position between high and low gear setting openings so that the flow through rotation retardation cylinders 324, 326, 342 and 340 will be retarded and consequently the rotation of offset cams 320 and 322 will be retarded. The effect of retarding cams 320 and 322 and thus retarding the rotation of planetary gear shafts 80 and 82, is to provide an intermediate gear ratio equivalent to the sume of the high gear torque augmented by a selected low gear torque. This is equivalent to applying an additional force to pinion gear 72 of planetary gear set 70.

Reverse gear would be achieved through setting the transmission in the low gear mode explained above and then interposing conventional reverse gear arrangements to turn shaft 22 in a counterclockwise manner. With the transmission set as explained above for high gear, an overdrive gear could be interposed for turning shaft 22 clockwise but at a higher revolution than shaft 18.

The operation of the transmission has been described for a manual setting of three-way valve 140 and throttling valve 390. The present transmission is also capable of automatic operation. Of course, the position of the three-way valve 140 corresponding to the neutral position of the transmission would always be manually set as it is in conventional automatic transmissions. This is also true of the position of three-way valve 140 for the low position. Under normal driving conditions the shift lever for three-way valve 140 would be set at the position corresponding to the high gear position and the intermediate gear ratio position. That is, with valve 140 connected between ports 132 and 134. This permits cage 30 to rotate freely in a clockwise direction but prevents the counterclockwise or backwards rotation of cage 30 through the synchronized action of rotation retardation cylinders 102, 104, 106 and 108. For automatic operation valve 390 could be positioned by servomotors driven by a computer means in which was stored certain performance characteristics and logic of the engine. The speed of crank shaft 18 and drive shaft 22 is monitored, for example, by means of a magnetic sensor 500 which includes a strip of magnetic tape 502 attached to each shaft. Each sensor 500 is connected to a counter 504 which counts the number of times strip 502 passes the sensor in a predetermined time interval to determine shaft revolutions per minute. Appropriate logic circuitry 506 is provided to receive the counter output and generate a signal indicative of the rate of change of RPM of each shaft 18 and 22. Sensor 510 generates an electrical signal indicative of the manifold vacuum of the engine. This signal is input to logic circuit 506. If the revolution of the drive shaft 22 and crank shafts 18 were decreasing but with a constant or increased motor manifold vacuum the logic circuitry would sense this and cause a slightly lower gear ratio to be selected. The opposite would be true, that is a tendency to a higher gear, for decreasing power demand. It is anticipated that the transmission would be locked into the high gear mode above the speed 28 m.p.h. and be returned to the intermediate mode when the speed fell below 28 m.p.h.

From the operator's point of view this novel transmission is controlled and operated much like a conventional manual transmission. The operator uses a clutch pedal, a shift lever and a throttle pedal. The clutch pedal operates valves 140 and 780 through appropriate linkages. The shift lever operates valve 390.

Valve 140 is operated in part (i.e., setting it either to A or B position) by a left foot clutch floor pedal similar to a conventional clutch pedal. When the pedal is fully depressed, valve 140 is fully set to the "A" (neutral) position and valve 780 is set so that the clutch is released. Conversely, valve 140 is fully set to the "B" (low) position and valve 780 is set so that the clutch is engaged when the foot pedal is fully released. It is thus evident that gradual depressing or releasing of the foot pedal makes for a smooth transition of the transmission from neutral to low gear or vice verse. Please note that the setting of valve 140 to the "C" position is discussed below.

Valve 140 is a three-way valve having the following settings. "A" position permits counterclockwise rotation of the cage 30, i.e., transmission in neutral. "B" position holds the planetary gear cage 30 stationary against rotation, i.e., transmission in low gear. "C" position permits the planetary gear cage 30 to rotate only in a clockwise manner (identical to rotational direction of the motor), i.e., transmission in the intermediate gear range of overall gear ratios. This same setting of valve 140 is maintained in high gear since the disengagement of the clutch (which occurs for high gear) isolates the circular, eccentrically mounted cam 718 and its attendant retardation cylinders from the planetary gear cage 30 rotation.

The variable valve 390, for controlling the rate of rotation of the gears 320 and 322 within the planetary cage 30, is operated by a floor or a steering-column mounted gear shift lever in the manual mode or by servo motors in the automatic mode. The range of movement of this shift lever would be as follows: neutral, low, intermediate and high. This range of movement would have detents between each of the above stated operational modes of the transmission. It is evident that gradual advancement of the shift lever through the intermediate range provides the infinite number of intermediate gear ratios. Lastly, a means would also be provided to allow the movement of the shift lever, to the above indicated neutral position, to additionally cause valve 140 to be set and held in the "A" (neutral) position. Of course, it is now obvious that valve 390 is set fully opened for both the neutral and low gear mode of transmission. Further, movement of the shift lever, to the intermediate drive range also causes valve 140 to be set to the "C" position through appropriate linkages.

As stated above, depressing the left-foot clutch pedal orients valve 140 to the "A" position (neutral). This action also causes the following to occur. Disengagement of the clutch separates the retardation means (i.e., the eccentrically mounted circular cam 718 and its retardation cylinders) from the planetary gear cage 30. The cam, etc. become stationary while the planetary gear cage 30 is then free to rotate either counterclockwise as would be the case in neutral or clockwise as would be the case with the vehicle experiencing certain forward motion. Depressing the clutch does not effect the position of the valve 390 shift lever. The motor is free to be returned to idle or its RPM may be increased.

When the foot pedal is fully released, valve 140 moves to the "B" position (low) and the shift lever for valve 390 is manually moved to the low position to avoid stalling, the following occurs. The clutch becomes fully engaged so that the circular cam 718 and rotation retardation cylinders control the rotation of the planetary gear cage 30. Valve 140 is set to the "B" position. Valve 390 remains fully opened. The vehicle accelerates in the low gear mode as the throttle is advanced.

When the shift lever for valve 390 is moved from low gear position to the intermediate gear range, the following occurs. The clutch remains engaged. Valve 140 is moved to a "C" type setting by means of an appropriate linkage so that the cage is permitted to rotate only in a clockwise manner. This rotation control is accomplished by the retardation units. Faster vehicle speed (i.e., a move towards high-gear) is achieved by advancing the shift lever and the throttle.

Once the shift lever is advanced to the high gear position, the following occurs. The clutch is fully disengaged and the planetary gear cage 30 rotates free of its retardation assembly (i.e., the cam, clutch plate, retardation pistons, etc.). This assembly is stationary when the transmission is in high gear. Valve 390 is fully closed and the planetary gears 320 and 322 within the planetary gear cage cease to rotate about their own axes.

By observing a tachometer or by listening to the engine, the operator can match the engine output to the power demanded by selecting the correct intermediate gear ratio. This improves efficiency over a conventional transmission which only provides a small number of specific gear ratios which rarely exactly matches the optimum gear ratio. This transmission is equally well suited to small cars, large cars, heavy trucks, tread-type vehicles, buses, etc. The latter, large-engine type vehicles, would be expected to use at least two of these transmissions coupled in series.

When two of these transmissions are coupled in a series of tandem manner (i.e., one directly inputing to the other), it would only be necessary to have single valves in each of the independent hydraulic systems control the functioning of both the transmissions. Each of the transmissions would, of course, be identically configured as to: size of planetary gears, clutch assembly and hydraulic lines. In short, one valve 140 and 390 plus one clutch valve would control both transmissions.

The overall gear ratio available in low gear would by a multiplication of the numerical gear reduction ratios of the individual transmission. Use of this tandem arrangement would not be necessary unless there was a need to have the overall gear reduction ratio between input and output shafts of a transmission exceed approximately 6:1.

For a tread-type vehicle (i.e., military tank, earthmoving tractor, etc.) one transmission would be used for each tread. The tread transmissions would be coupled in parallel to a third transmission which is connected to the engine. The three transmissions forming a T-arrangement would be identically configured and the transmissions for the right and left tread would each have its own shift lever valve 390. These 390 valves would permit steering to be achieved by reducing the torque delivered to one side of the vehicle. This, of course, would cause the vehicle to track in that direction. Notably, the overall gear ratio for this arrangement would be as stated above, that is a multiplication of the gear ratios of transmission connected to the tread and the transmission connected to the engine. Additionally, the presence of this parallel coupling arrangement provides the large overall gear reduction ratio that would be needed for these type vehicles while also providing a steering capability.

It will be understood that the particular embodiment of the transmission of the present invention described and disclosed above is susceptible of considerable modification without departing from the invention concept herein disclosed. Consequently, it is not intended that this invention shall be limited to the precise details disclosed but only as set forth in the following claims.

What I claim is:

1. A constant meshed, variable gear ratio transmission comprising:
   a gear box including:
     a housing,
     input and output shafts journaled in said housing;
   a plurality of planetary gear sets in said housing coupling said shafts together and including,
     a pinion gear on each of said shafts;
     a plurality of planetary gears meshing with each said pinion gear;
     planetary gear shafts connecting the corresponding planetary gears of each pinion;
     a cage rotatably supported in said housing and supporting said planetary gear shafts;
   means for controlling the rotation of said cage, including:
     first hydraulic circuit means;
     clutch means operatively associated with said first hydraulic circuit means and said cage for selectably engaging said first hydraulic circuit means to selectably control the rotation of said cage; and
     second independent hydraulic circuit means for controlling the rotation of said planetary gear shafts.

2. The transmission of claim 1 wherein said clutch means includes:
   a clutch housing mounted on said cage;
   an annular shaft mounted coaxially about said input shaft and adapted to translate axially with respect to said input shaft and having an end extending into said clutch housing;
   at least one clutch friction plate and at least one clutch pressure plate cooperatively mounted on said housing and said annular shaft to provide a clutch action;
   actuator means operatively connected to said annular shaft for translating said shaft to engage said clutch friction plate with said clutch pressure plate thereby clutching said annular shaft to said cage so that said annular shaft and said cage rotate together;
   biasing means for biasing said actuation means; and
   cam means fixed to said annular shaft and adapted to rotate therewith and operatively engaging said first hydraulic circuit means.

3. The transmission of claim 2 wherein said cam means includes a circular cam surface disposed about said annular shaft, the center of said cam surface radially offset from the axis of said annular shaft.

4. The transmission of claim 2 wherein said biasing means includes:
   a throw-out bearing disposed about said annular shaft; and
   spring means disposed about said annular shaft and bearing against said throw-out bearing and said gear box housing for biasing said clutch means.

5. The transmission of claim 2 wherein said actuator means includes:
   a yoke receiver fixed to said annular shaft;
   a yoke operatively engaging said yoke receiver;
   a clutch yoke arm fixed to said yoke and pivotally mounted on said gear box housing; and
   means for pivoting said yoke arm about said pivot mounting to translate said annular shaft with respect to said input shaft to operate said clutch means.

6. The transmission of claim 5 wherein said pivoting means for said yoke arm includes:
   a third hydraulic circuit means having:
     a source of hydraulic fluid under pressure;
     a double action piston in fluid communication with said source and operatively connected to said clutch yoke arm; and,
     valve means for selectably providing fluid communication between said source and one side or the other side of said double action piston.

7. The transmission of claim 2 wherein said first hydraulic circuit includes:
   a plurality of rotation retardation cylinders affixed to the inside of said housing and having piston rods adapted for engaging said cam;
   a source of hydraulic fluid under pressure in fluid communication with said rotation retardation cylinders; and,
   switching means for selectively determining the operational mode of said cage to selectively lock the cage, permit it to rotate freely in either direction or permit it to rotate freely in the direction of rotation of said input shaft but to prevent rotation in a direction opposite to the rotation of the input shaft.

8. The transmission of claim 7 wherein said first hydraulic circuit further includes means for synchronizing the action of said rotation retardation cylinders with the rotation of the cage including:
- selectably operable valve means in fluid communication with the inlet of each cylinder;
- selectably operable valve means in fluid communication with the outlet of each cylinder; and,
- means operatively connected to said annular shaft for selectably operating each of said selectably operable valve means in synchronous response to the rotation of said cage.

9. The transmission of claim 8 wherein said means for selectably operating said selectably operable valve means includes;
- a first gear fixed to said annular shaft;
- a plurality of second gears meshing with said first gear, each of said second gears operatively connected to operate the selectably operable valves for one rotation retardation cylinder;
- flange means on said first gear overlapping the edge of each said second gears for maintaining said first and second gears in meshing relationship when said annular shaft translates;
- spring mounting means for each of said second gears to permit said second gears to translate on its axis and move with said first gear.

10. The transmission of claim 8 wherein said switching means includes:
- a three-way valve in fluid communication between each of said rotation retardation cylinders and a reservoir for controlling the return of hydraulic fluid from said cylinders to said reservoir;
- having a first position permitting fluid communication between each of said cylinders and said reservoir through said selectable valve means;
- having a second position for permitting fluid communication directly between each of said cylinders and said reservoir;
- having a third position for preventing fluid communication between each of said cylinders and said reservoir; and,
- whereby when said switch is in said third position the hydraulic fluid will be trapped in a closed system so that said piston will not be permitted to retract into said cylinder thereby locking said cage against rotation.

11. The transmission of claim 1 wherein the means for controlling the rotation of said planetary gear shafts comprises:
- cam means fixed to each said planetary gear shaft having a cam surface about the circumference thereof;
- at least on rotation retardation cylinder for each said cams mounted on said cage and including a piston rod for rotatably engaging said cam surface; and,
- a closed hydraulic circuit for controlling the motion of said piston in said cylinder.

12. The transmission of claim 11 wherein said closed hydraulic circuit includes:
- a variable position throttling valve having a first position blocking the flow through said closed circuit and trapping an amount of hydraulic fluid between said valve and said piston to prevent retraction of said piston to thereby lock said cams to prevent the rotation thereof; and,
- having a second position permitting free flow through said closed circuit so that said piston will move freely in said cylinder and permit the rotation of said cams; and,
- having a plurality of positions between said first and said second positions for selectively restricting the flow through said valve to amounts between said flow at said first or said second position.

13. The transmission of claim 11 wherein said cam means includes a circular cam affixed to said planetary gear shaft for rotation therewith at a point radially spaced apart from the center of said circular cam.

14. The transmission of claim 13 further including means for sensing engine performance; and, means responsive to said sensing means for controlling the rotation of the cage and the rotation of the planetary gear shafts.

* * * * *